United States Patent [19]

Wojcik et al.

[11] 4,016,346

[45] Apr. 5, 1977

[54] CATIONIC POLYMERIZATION PROCESS

[75] Inventors: Ronald Thomas Wojcik, Stamford; Erwin Richard Ruckel, Darien, both of Conn.

[73] Assignee: Arizona Chemical Company, Wayne, N.J.

[22] Filed: Feb. 3, 1976

[21] Appl. No.: 654,687

[52] U.S. Cl. .................... 526/221; 252/429 A; 252/442; 260/4 R; 260/887; 260/897 A; 260/899; 526/281

[51] Int. Cl.² .................................. C08F 10/14

[58] Field of Search .................... 526/221, 281

[56] References Cited

UNITED STATES PATENTS

| | | | |
|---|---|---|---|
| 1,720,929 | 7/1929 | Staudinger et al. | 526/221 |
| 2,734,047 | 2/1956 | Smith et al. | 526/221 |
| 2,932,631 | 4/1960 | Rummelsburg | 526/281 |
| 3,297,673 | 1/1967 | Sellers et al. | 526/281 |
| 3,470,145 | 9/1969 | Lipman | 526/281 |
| 3,478,005 | 11/1969 | Wheeler | 526/281 |

*Primary Examiner*—Harry Wong, Jr.
*Attorney, Agent, or Firm*—Harry H. Kline

[57] ABSTRACT

There is provided a process for cationically polymerizing or co-polymerizing batchwise or continuously α-pinene by adding α-pinene either alone or in admixture with other terpene monomers, incrementally to a catalyst system comprising an aluminum halide and an antimony halide in the presence or absence of a (lower)alkyl, alkenyl or aralkyl halide in an inert solvent while controlling the temperature of reaction in the range of −30° C. to +30° C., drowning the polymerization mixture in water, separating the organic phase therefrom, removing the solvent therefrom and recovering a solid polymer in good yield.

10 Claims, No Drawings

CATIONIC POLYMERIZATION PROCESS

The present invention relates to a method for polymerizing α-pinene to obtain a polymer in good yields. More particularly, it relates to a method for polymerizing α-pinene either alone or in admixture with other terpene monomers untilizing a catalyst system comprising an aluminum halide and an antimony halide in the presence or absence of a (lower) alkyl, alkenyl or aralkyl halide to obtain an alpha-pinene polymer or copolymer, having a softening point of at least 110° C. and possessing a relatively high molecular weight, in good yield.

As is known, α-pinene has been subjected to polymerization utilizing carbocationic catalyst systems loosely referred to as Friedel Crafts catalysts, such as aluminum chloride or aluminum chloride in conjunction with either a trialkyl silicon halide or a dialkyl tin dichloride, attention being directed to U.S. Letter Pat. Nos. 3,354,132 and 3,478,007. However, none of the prior methods is entirely satisfactory because the yields obtained are economically unattractive. Moreover, even to obtain such unsatisfactory yields, such prior procedures require the drying or removal of water from the monomer and other components of the mixture prior to polymerization. If a straight forward process could be provided whereby yields are substantially increased without dramatically increasing the cost for preparaing desired product, such a process would fulfill a need long sought for in the art.

It is, therefore, a principal object of the invention to provide a straightforward process for polymerizing α-pinene. It is a further object to polymerize or copolymerize α-pinene utilizing a catalyst system comprising an aluminum halide and an antimony halide in either admixture with or in the absence of an alkyl, alkenyl or aryl halide to obtain polymers in economically attractive yields at a reasonable cost. It is a still further object to prepare high softening point resin hitherto unavailable. It is a still further object to obtain α-pinene polymers from corresponding monomers which have not been previously dried to remove water therefrom. Other objects and advantages will become apparent from a reading of the ensuing description.

To this end, it has been found that either α-pinene or mixtures of α-pinene and other terpene monomers, can be polymerized at temperatures ranging between about minus 30° C. and about plus 30° C. for from about 1 to about 4 hours in a straightforward manner to obtain corresponding homo- or co-polymers in economically attractive yield. Unexpectedly, a catalyst system comprising suitable amounts of an aluminum halide and an antimony halide, in the absence or presence of an alkyl, alkenyl or aryl halide is utilized during polymerization.

According to the process of the invention, α-pinene along or in conjunction with other terpene monomers is subjected to cationic polymerization in the presence of a catalyst system mixture comprising a major amount of aluminum chloride or bromide and a minor amount of antimony halide in the absence or presence of an alkyl, alkenyl or an aralkyl halide. In general, there is first prepared a slurry of the aforementioned catalyst system in an inert solvent. Monomer, such as α-pinene, is then added incrementally with vigorous stirring while maintaining the reaction mixture at from about minus 15° to about minus 30° C. to insure maximum yield of resin of high softening point. After the monomer has been added, stirring and cooling are continued for at least fifteen minutes or until the amount of unreacted monomer is substantially reduced. Thereafter, the mixture is permitted to rise slowly to a temperature of about 20° C to 30° C over a period of 1 to 4 hours. The reaction mixture is quenched with water or dilute acid or dilute base with the production of an organic phase and an aqueous phase. The latter mixture is filtered so as to remove insoluble catalyst remnants. Resultant polymer is then recovered as a residue after removal of the organic solvent, as by steam distillation, or if applicable can be used in the solvent solution.

As a monomer which can be employed in the process of the invention, there is mentioned α-pinene, β-pinene, limonene, isoprene and styrene as well as mixtures of the same to prepare either homo- or co-polymers.

In general, the overall catalyst system comprises two components and, optionally, a third component. As hereinabove stated, the system comprises an aluminum halide, such as aluminum chloride or aluminum bromide and an antimony halide, such as antimony trichloride, antimony tribromide or antimony pentachloride. Optionally, the system may contain (a) an alkyl halide, such as isopropyl chloride, sec-butyl bromide, and t-butyl chloride, or (b) an allyl halide, such as allyl chloride or allyl bromide, or (c) an aralkyl halide, such as benzyl chloride or benzyl bromide and equivalents thereof.

It is a good practice to employ a wide range of the aforementioned catalyst system during polymerization. Usually, between two (2) and twelve (12) weight percent of the catalyst system, based on the overall amount of monomer, is used. The catalytic system comprises: (a) 70% to 85% of aluminum chloride or bromide, (b) 30% to 10% of an antimony chloride or bromide, and (c) 0% to 5.0% of an alkyl, alkenyl or aralkyl halide, respectively. A good operating range of catalyst components is 2 to 3 parts of aluminum chloride, 0.7 to 0.9 part of antimony chloride and from 0 part to 0.2 part of alkyl, alkenyl or aralkyl halide, per 100 parts of monomer, the parts being by weight. Utilizing small amounts of aluminum chloride, say up to 2%, based on monomer, in conjunction with antimony trichloride there is prepared a high softening point resin between 145° C and 150° C in yields of about 80%.

Exemplary solvents or diluents include aromatic hydrocarbons and, preferably, toluene, mixed xylene, diethyl benzenes, Solvesso 100 (98% aromatic, 0.876 sp. gr., 166° F. closed cup flashpoint, 321° F. initial boiling point, 50% off at 328° F., 349° end point). Other solvents that can be employed are aliphatic hydrocarbons, mixed aliphatic and aromatic hydrocarbons and halogenated hydrocarbons, both aliphatic and aromatic, such as methylene chloride, ethyl chloride, methyl chloride, or chlorobenzene, heptane and mixtures of heptane and xylene.

Advantageously, in the production of high yields of high softening point resin which characterizes the present invention, both the α-pinene reactant and the inert solvent can be utilized without the removal of water therefrom. For instance, it is known that an aromatic solvent containing as much as 400 ppm water and the monomer containing as much as 200 ppm water can be used in polymerization. Greater amounts of water, however, cannot be tolerated without concomitant reductions in yields of polymer. Alternatively, if desired, the solvent and monomer can be dried prior to reaction by azeotropic removal of water or their passage through a drying agent.

In a preferred practice of the invention, α-pinene and solvent are each employed undried, that is, with from about 100 and 300 ppm of detectable water, respectively. The overall system is next flushed out with an inert gas, suitably nitrogen. The solvent and catalyst system are introduced into the dry vessel and α-pinene is then added incrementally and progressively, for instance, in dropwise fashion, while the reaction medium is stirred vigorously. As soon as the α-pinene addition begins, an exotherm occurs and cooling is applied to maintain the reaction medium at from minus 15° C to minus 20° C. Stirring and temperature control at this level are continued for a period of time, generally 30 minutes, after all of α-pinene had been added. Some fifteen minutes to four hours suffice for the latter purpose. Thereafter, the temperature is allowed to gradually rise over a period of from 1 to 2 hours to 20° C to 25° C, where it is maintained for from two to four hours. Normally, reaction is continued until essentially all monomer is converted.

At the end of this time, the reaction medium is quenched to inactivate the catalyst system, as by adding a volume of water equal to the volume of α-pinene monomer used. If desired, there may be used a dilute solution of an acid, such as hydrochloric acid or of a base instead of water. In either case, there are formed two layers, one of which constitutes a hydrocarbon phase and the other is an aqueous phase. Resultant mixture is filtered to remove insoluble catalyst remnants and the layers are separated. The hydrocarbon phase is washed repeatedly with water until neutral.

In order to facilitate a further understanding of the invention, the following examples are presented primarily for purposes of illustrating certain more specific details thereof. The invention is not to be deemed limited thereby except as defined in the claims. Unless otherwise noted, the parts and percentages are by weight.

EXAMPLE 1

To a nitrogen blanketed three-neck flask are introduced 450 parts of toluene and there are next added 18 parts of aluminum chloride, followed by 5.6 parts of antimony trichloride. The resultant mixture is vigorously stirred while cooling to −20° C. 600 Parts of α-pinene are then introduced over a period of 50 minutes. The reaction mixture is held at minus 15° C to minus 20° C by a cooling bath. Thereafter, the contents of the flask are maintained in an inert nitrogen atmosphere at this temperature for one-half hour. Thereafter, the temperature is allowed to rise gradually with controlled cooling finally reaching +20° C to +25° C after one and one-half hours. There is next added water equal in volume to the α-pinene used, to inactivate the catalyst system, and to cause separation of the aqueous and organic phase. Following filtration to remove insolubles remaining phases are separated, and the organic phase is washed with water until neutral. It is then charged to a suitable flask provided with a heater, thermometer and nitrogen atmosphere, and the temperature gradually raised to 210° C, thereby removing the volatile solvent. The introduction of nitrogen is discontinued and in its place steam is passed in and the temperature raised to 215° C. Steaming is continued until the resin softening point reaches the desired limit. Application of vacuum removes any trace of moisture and the molten resin is obtained in 94% yield and having:

| Softening point | 115° C, ring and ball |
|---|---|
| Color | Gardner 2 |
| Molecular Weight | 850 |

EXAMPLE 2

Repeating Example 1 in every detail except that dry monomer (50 ppm water) and 2 parts by volume of t-butyl chloride are added to the reaction mixture and dry xylene (80 ppm water) is substituted for toluene. A yield of 97% of resin having a softening point of 115° C is obtained.

Substituting heptane for xylene in the above example, there is obtained 115° C resin in similar yields.

EXAMPLES 3–9

The procedure of Example 1 is repeated in every detail except that varying amounts of aluminum chloride and a plurality of antimony halides are employed in the absence or presence of an alkyl halide, allyl halide or benzyl halide to obtain α-pinene polymer in good yields as set forth in Table I below:

TABLE I

| Example | Amt. of $AlCl_3$ | Amt. of Antimony Halide Added | Amt. of Ancillary Halide | % Yield 115° C. Resin |
|---|---|---|---|---|
| 3 | 3% | $SbCl_3$ - 0.47% | None | 55 |
| 4 | 3% | $SbCl_3$ - 0.47% | t-B$\mu$Cl - .57% | 85 |
| 5 | 2% | $SbCl_3$ - 0.93% | None | 95 |
| 6 | 3% | $SbCl_3$ - 0.93% | $C_6H_5CH_2Cl$ - .19% | 98 |
| 7 | 3% | $SbCl_3$ - 1.40% | $CH_2=CH-CH_2Cl$ - .23% | 94 |
| 8 | 3% | $SbBr_3$ - 2.1% | t-B$\mu$Cl - .28% | 86 |
| 9 | 3% | $SbCl_5$ - 1.2% | None | 92 |

EXAMPLE 10

Example 1 is repeated in every detail except that a 50/50 mixture of α-pinene and limonene is employed in lieu of α-pinene alone. There is recovered a copolymer of α-pinene and limonene having a softening point of 115° C. in a 91.5% yield.

EXAMPLE 11

The procedure of Example 1 is repeated in every detail except that a 80/20 mixture of α-pinene and β-pinene is used to obtain a copolymer of α-pinene and β-pinene as a 115° C copolymer resin in a yield equal to 94%.

EXAMPLE 12

This example illustrates the continuous polymerization of α-pinene.

To a suitable reaction vessel equipped with stirrer, gas inlet, dropping funnels, screw feeder for aluminum chloride, overflow tube and thermometer are added 85 ml of dry xylene followed by the addition of 3 g. of anhydrous $AlCl_3$ and 0.9 g. of antimony trichloride. The mixture is cooled to $-30°$ C. The 100 g. of $\alpha$-pinene monomer is metered into resultant slurry over a 10 minute interval, while maintaining the temperature at $-15°$ C. to $-20°$ C. This fills the reactor to the overflow tube. The continuous phase of the polymerization is then carried out by simultaneous proportionate metering to the reactor of the following: (a) a solution of 800 g. $\alpha$-pinene in 665 ml xylene, (b) a solution of 7.5 g. $SbCl_3$ in 200 ml xylene and (c) 24 g. of solid $AlCl_3$. During the continuous phase of the polymerization, the reaction mixture is draining into a first reservoir flask which is maintained at $-20°$ C. The contents of this first reservoir flask cascades in sequence into similar reservoir flasks maintained at $-5°$ C, $+5°$ C and finally room temperature, respectively. Finally, the polymerization mixture is permitted to cascade into water, thus effecting deactivation of the catalyst system. For convenience, a fixed amount of deactivated polymerization mixture is isolated and heated to 80° C and filtered to remove the black insoluble catalyst fragments. The organic phase is separated, washed once with 5% soldium carbonate and then with water until neutral. The solvent is recovered by distillation and the molten residue steam distilled with water to a pot temperature of 230° C–235° C. There is then recovered a 94% yield of resin having a softening point 129.5° C.

EXAMPLE 13

The process of Example 12 is repeated in every detail except that the sequential reaction temperatures are 5° C, 10° C and room temperature. There is obtained a 92.3% yield of 115° C resin.

EXAMPLE 14

The process of Example 13 is repeated except that there is employed as the feed monomer a 70/30 ratio of $\alpha$-pinene/$\beta$-pinene and 2 weight percent of aluminum chloride. There is obtained a 119° C resin in 92.4% yield.

EXAMPLE 15

Alpha-pinene resin as prepared in accordance with Example 1 is extremely light in color and shows exceptionally high compatability with commonly used polymers and film formers. It has the ability to tackify other materials with which it is compatible, such as styrene-butadiene rubber, natural rubber, ethylene-propylene elastomers, chlorobutyl and butyl rubber by methods well known in the art.

EXAMPLE 16

Polymerized $\alpha$-pinene resin as prepared in the procedure of Example 1 after azeotropic drying but without the removal of solvent therefrom is directly employed in a composition to effect tackification of rubbery materials as shown in Example 13, above.

Similar results are attained in the above example utilizing the copolymer prepared in accordance with Example 10.

We claim:

1. A process for polymerizing $\alpha$-pinene monomer or a mixture of at least 50% $\alpha$-pinene and other terpene monomers which comprises the steps of: establishing a catalyst system comprising (1) a minor amount of an antimony halide, (2) a major amount of aluminum chloride or aluminum bromide or mixtures of the latter in an inert solvent, adding thereto at a temperature between about minus 30° C and about plus 30° C $\alpha$-pinene monomer or a mixture of at least 50% $\alpha$-pinene and other terpene monomers incrementally with agitation, adjusting and maintaining the temperature of the mixture at about minus 30° C to about plus 30° C for from about one to about 4 hours to obtain an $\alpha$-pinene polymer.

2. A process for polymerizing $\alpha$-pinene monomer or a mixture of at least 50% $\alpha$-pinene and other terpene monomers which comprises the steps of: establishing a catalyst system comprising (1) a minor amount of an antimony halide, (2) a major amount of aluminum chloride or aluminum bromide or mixtures of the two in an inert solvent, adding thereto at a temperature between about minus 30° C and about plus 30° C $\alpha$-pinene monomer or a mixture of at least 50% $\alpha$-pinene and terpene monomers incrementally with agitation, adjusting and maintaining the temperature of the mixture at about minus 30° C to about plus 30° C for from about 1 to about 4 hours, quenching the latter mixture with an aqueous solution to obtain an $\alpha$-pinene resin-solvent solution, filtering any insolubles therein, separating resultant aqueous phase from the $\alpha$-pinene-resin-solvent solution, and recovering a solid polymer therefrom.

3. The process according to claim 1 wherein the inert solvent and $\alpha$-pinene monomer in admixture contains from about 100 ppm to about 400 ppm water.

4. The process according to claim 1 wherein the catalyst system comprises aluminum chloride, antimony chloride and small amounts of an adjuvant selected from the group consisting of lower alkyl halide, lower alkylene halide and aralkyl halide.

5. The process according to claim 2 wherein the catalyst system comprises from about 70% to about 85% aluminum chloride and from about 30% to 10% of an antimony halide, and wherein the overall amount of catalyst used ranges between about 2% and 12%, of said monomer, said percentages being by weight.

6. The process according to claim 5 wherein the antimony halide is antimony trichloride ranging from about 0.7% to 0.9% of the antimony component, based on $\alpha$-pinene monomer mix.

7. The process according to claim 5 wherein the process is carried out batchwise.

8. The process according to claim 5 wherein the process is carried out continuously.

9. The process according to claim 4 wherein the adjuvant is t-butyl chloride.

10. The process according to claim 4 wherein the adjuvant is allyl chloride.

* * * * *